United States Patent [19]
Edgar

[11] Patent Number: 5,071,799
[45] Date of Patent: Dec. 10, 1991

[54] INCANDESCENT MANTLES

[76] Inventor: John P. Edgar, P.O. Box 4020, Alameda, Calif. 94501

[21] Appl. No.: 458,313

[22] Filed: Dec. 28, 1989

Related U.S. Application Data

[63] Continuation-in-part of Ser. No. 292,767, Jan. 3, 1989, abandoned.

[51] Int. Cl.$^5$ .......................... C04B 35/48; F21H 1/00
[52] U.S. Cl. ..................................... 501/103; 431/100
[58] Field of Search ........................ 501/103; 431/100

[56] References Cited

U.S. PATENT DOCUMENTS

| | | | |
|---|---|---|---|
| 399,174 | 3/1889 | Walsbach | 431/103 |
| 409,531 | 8/1889 | Walsbach | 431/103 |
| 546,792 | 9/1895 | Voelker et al. | |
| 685,730 | 10/1901 | Nernst et al. | |
| 685,732 | 10/1901 | Nernst et al. | |
| 685,733 | 10/1901 | Nernst et al. | |
| 943,488 | 12/1909 | Terrell | 431/100 |
| 1,030,787 | 6/1912 | Monosmith | |
| 3,385,915 | 5/1968 | Hambing et al. | |
| 3,738,793 | 6/1973 | Reid et al. | 431/328 |
| 4,507,394 | 3/1985 | Mase et al. | 501/103 |
| 4,604,228 | 8/1986 | Perroud et al. | 252/492 |
| 4,877,553 | 10/1989 | Diederich | 252/492 |

FOREIGN PATENT DOCUMENTS 0081061 5/1985 Japan .................................. 501/103

OTHER PUBLICATIONS

Encyclopedia Brittanica, 11th Edition, London, England, 1911, vol. XVI, Reference 1, pp. 655 through 659.
Illustrations of Incandescent Mantles, Brochure distributed by American Wick Co. U.S.A., 1988.
Gas Appliance and Space Conditioning Newsletter, American Gas Association, Independence, Ohio, Mar. 1987, pp. 2 and 8.
Encyclopedia Britannica, 11th Edition, London, England, 1911, vol. XVI, Reference 2, p. 669.
Machine Design Journal, Penton Publishing, Cleveland, Ohio, Jul. 23, 1987, pp. 84 through 89.
Zircar Product Bulletin ZPI-204, Zircar Products Co., Florida, N.Y., Dec. 1, 1986.
Incandescent Lighting, S. I. Levy, Sir Isaac Pitman & Sons Ltd., London, 1922, pp. 75 through 91.
Technics Magazine, George Newnes, London, 1904, vol. 1, p. 499.

*Primary Examiner*—William R. Dixon, Jr.
*Assistant Examiner*—Melissa Bonner
*Attorney, Agent, or Firm*—Weingarten, Schurgin, Gagnebin & Hayes

[57] ABSTRACT

An improved incandescent mantle which is stronger than mantles produced in the past as well as free of radioactive materials. The present invention provides a mantle comprised of zirconia, yttria and erbia, which produces a resulting light output and color comparable for practical purposes to that of traditional thorium mantles. Although the invention is particularly adapted to mantles of inverted form, it is also applicable to other forms.

15 Claims, 1 Drawing Sheet

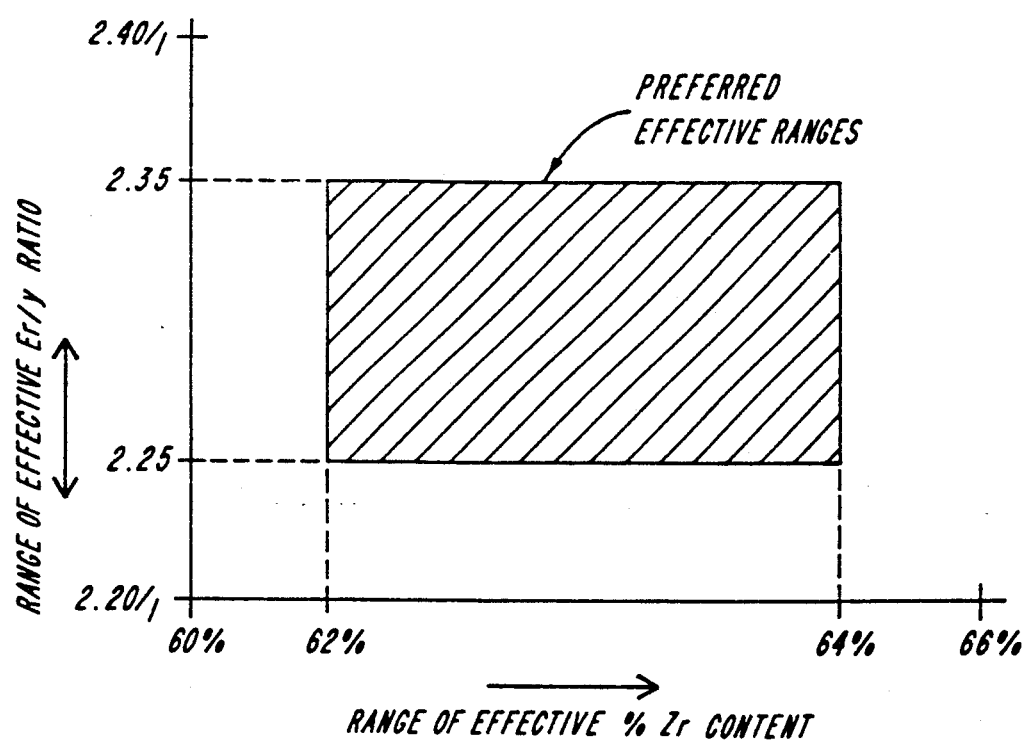

INCANDESCENT MANTLES

RELATED APPLICATION

This application is a continuation in part of application Ser. No. 07/292,767 filed on Jan. 3, 1989, now abandoned, entitled: INCANDESCENT MANTLES.

FIELD OF THE INVENTION

This invention relates in general to incandescent mantles used in lamps burning fuels in gas or liquid form, and in particular to mantles used in portable lamps of this type.

BACKGROUND OF THE INVENTION

Incandescent mantles became a commercially practicable product following the introduction by Carl Auer Von Welsbach in 1893 of a mantle having a composition of about 99% thorium oxide and about 1% cerium oxide. This composition was determined by experimentation covering a wide range of metal oxides including rare earth elements.

Thorium is a naturally occurring radioactive metal. Its decay products include alpha and beta radiation, radium isotopes, and thoron gas, which is an isotope of radon gas. Thorium is listed by US government agencies as carcinogenic, and its processing is kept under strict governmental licensing and control.

Thorium mantles are very fragile and the shocks induced by normal usage cause rapid disintegration requiring frequent replacement. Each time a mantle is changed and the old mantle discarded, about 0.3 grams of thorium oxide, which is soft and powdery, is released into the environment in an uncontrolled manner, exposing the user and others to a potential health hazard.

Early attempts to provide alternatives to the thorium/cerium composition were focussed on a desire to circumvent the Welsbach patents rather than to eliminate thorium oxide, but once these patents expired the thorium/cerium composition was universally adopted and, except for minor proprietary variations by various manufacturers, this composition has remained virtually unchanged, since no effective alternative was considered possible or even necessary. Now, however, a need exists to reduce, or preferably eliminate, the unnecessary release of radioactive material into the global environment.

Further, a more robust incandescent mantle than the conventional thorium/cerium mantle heretofore provided would enhance the reliability and reduce the maintenance expenses of incandescent lanterns and gaslights, and permit the development of new forms of such devices, not possible with the fragile thorium mantle.

Although it has been recognized that zirconium oxide would be a stronger and non-radioactive alternative to thorium oxide as a material for incandescent mantles, a method for the practical production of mantles based on zirconium oxide has been wanting.

Encyclopedia Britanica 1 describes in some detail the early history of the incandescent mantle. On page 656 it is noted that zirconia, and yttria, were possible alternatives to thorium oxide, but they were considered unsuitable because of their fragility. Zirconia was also rejected on the basis of shrinkage and slow volatilization.

The earliest mantles were of upright form, in which the mantle was supported over a non-luminous flame by means of a wire frame. Although obsolete, this type of mantle is still manufactured for decorative purposes.

The problem of fragility was addressed in Voelker U.S. Pat. No. 546,792 which proposed an incandescent mantle fashioned from filaments of porcelanous material impregnated with solutions of rare earth salts, or with rare earth oxides incorporated in the porcelain base material. There is no record in the literature to indicate that such incandescent mantles were ever a commercial success.

A more recent attempt to address the fragility of thorium oxide mantles is disclosed in Reid et al U.S. Pat. No. 3,738,793, which has a layer of thorium and cerium oxides deposited on the outer surface of the porous ceramic element of a gas burner operating on the surface combustion principle.

The described manufacturing process is complex, it requires the deposition of several layers of metal oxides (column 2 line 29 through column 3 line 49) onto a special substrate followed by a heat treatment process, all conducted under carefully controlled conditions. There is no indication that incandescent lighting devices according to U.S. Pat. No. 3,738,793 have ever been produced on a commercial basis.

Gas Appliance and Space Conditioning Newsletter, March 1987, reviews the status of incandescent mantles and provides a reference that mantle compositions other than thorium/cerium were inferior to it in light output. Also reviewed is the device disclosed in the above mentioned U.S. Pat. No. 3,738,793 which, also, attempts to coat thorium/cerium oxide mixtures onto substrates of silicon carbide or zirconia, which are described as being the most promising materials because of excellent high temperature strength and thermal shock resistance, but these attempts are recorded as having poor success and that a sintering process instead of coating was to be tried. There is no indication in this document that the substrate materials were themselves to be used as the incandescent light emitting body.

Nernst U.S. Pat. No. 685,730, describes electric lamp glowers composed of 85% zirconia and 15% of yttria or other rare earth oxides. Nernst U.S. Pat. No. 685,732 describes electric lamp glowers composed of 80% zirconia, 10% yttria, and 10% erbia. Nernst U.S. Pat. No. 685,733 describes electric lamp glowers composed of zirconia combined with rare earth oxides derived from yttrium containing minerals in their natural-state proportions. However, to date, neither Nernst nor anyone else has described the use of zirconia, yttria and erbia in a gas mantle.

In each of the above Nernst patents, the materials were to be mixed with binding agents, compressed into bars or tubes, and fired in a furnace to produce ceramic elements termed glowers for use in Nernst lamps (see Encyclopedia Britannica, p. 669). The resulting glowers typically have thicknesses of about 1-2 mm, much greater than those of the fibers employed in gas mantles. These lamps made use of the property possessed by certain ceramic materials to be good electrical insulators when cold but good conductors when hot. After pre-heating to initiate conduction, the glower element was raised to, and maintained at, the required temperature by passage of an electric current thus rendering the element an incandescent light emitter.

Intended as an intermediate light source between the powerful carbon arc light and the weak Edison carbon filament lamp, the Nernst light was rendered obsolete by the introduction of the tungsten filament lamp, although Nernst glowers are still produced in small quantities as spectroscopic light sources. While the light emitting property of the Nernst glower does not depend on the passage of electric current, and in theory any suitable heat source can be employed to cause the materials of the glower to incandesce, use in conjunction with a gas flame is not known.

"Making Ceramics Tougher" (July 27, 1987) MACHINE DESIGN, pp. 84-89, discusses a new variety of ceramic materials based on metal oxides such as alumina, zirconia, and magnesia. These are termed transformation-toughened, or stabilised, ceramics in which a base oxide is alloyed or doped with a small percentage of other metal oxides which strengthen and stabilize the structure by reducing the metal oxide grain size, so increasing resistance to fracture.

One variety of transformation toughened ceramic is yttria-stabilized tetragonal zirconia polycrystal (Y-ZTP), which is zirconium oxide with the addition of a small percentage of yttrium oxide (8–10% for example). This ceramic has desirable strength properties, which may be improved further by the addition of a second stabilizing rare earth oxide to eliminate certain temperature degradation phenomena. It will be noted that the composition of the Y-ZTP materials bears a close resemblance to the Nernst glower materials described above, but also, that these materials have not been suggested for use in gas mantles. Another form of toughened ceramic utilizes aluminum oxide toughened with a small percentage of zirconium oxide and/or chromium oxide.

Ceramic fibers are of special value as heat insulating and refractory materials, but their preparation has been difficult due to the brittleness and high melting point of the appropriate materials. Hamling U.S. Pat. No. 3,385,915 discloses a process by which a host structure composed of a cellulosic material, such as a woven fabric, is used as a precursor to absorb dissolved metallic compounds after prior dilation of the woven fibers with plain water. The dissolved compounds enter into spaces within the microscopic crystallite structure of the dilated cellulosic fibers. A subsequent heat treatment, in an oxygen-controlled atmosphere within a special furnace, pyrolyses the organic fiber and leaves an amorphous refractory metal oxide structure in the shape of the host cellulosic material. The product ceramic fibers have tensile strength and flexibility. However, the heat treatment requires close control over temperature and the oxygen content of the atmosphere surrounding the fibers. It is emphasized in the disclosure, Column 7 line 23 through Column 8 line 5 that direct ignition of the impregnated material must be avoided because the product then becomes weak and brittle. The process of this disclosure is usually referred to as the precursor process for producing ceramic fibers.

Example 7 of the above disclosure, Column 14, line 67 through Column 15, line 19, describes application of the subject process to a thorium/cerium incandescent mantle commercially manufactured for use in gasoline lanterns. The resulting product was a thoria fiber structure having the desirable properties of strength and flexibility, which should render it suitable for incandescent mantle applications. However, discussion of this example with patentee Hamling indicated that when tested as an incandescent mantle, the light output was less than that obtained from a regular mantle, and after a period of use the amorphous structure of the thoria fibers reverted to the same crystallized form produced in a regular mantle when it is installed on a lantern burner and ignited prior to admission of fuel to the burner, as described on the mantle package.

The Zircar Product Brochure describes an end product of the precursor process which is commercially manufactured under the trade name of Zircar. One version of this utilizes zirconium and yttrium compounds, with hafnium as a second stabilizing agent, to reduce ceramic fibers. Incandescent mantles are not among the products offered by the manufacturers of Zircar.

Levy, S. I., *Pitman's Common Commodities and Industries;* "Incandescent Lighting", Sir Isaac Pitman and Sons Ltd.: London (1922), pages 75 through 91, describes in some detail the actual processes of incandescent mantle manufacture, which is itself a form of precursor process. A cellulosic yarn, usually rayon, is knitted into the form of a tubular webbing which is cut in sections to form precursor mantles. These sections are closed by stitching at one end, leaving the other end open. They are then impregnated by immersion in a solution of salts of thorium and cerium, usually the nitrates. Excess solution is removed and the sections are dried.

At this stage the mantle manufacture may be completed in several different ways. For use as a soft or tie-on inverted mantle for portable gasoline and similar lanterns, the open end is threaded with a length of heat resisting yarn by which means the mantle may be tied to the burner nozzle of the lantern. For use, the mantle is ignited without the fuel gas flowing. This pyrolysis burns away the rayon base yarn and converts the thorium and cerium nitrates into oxides, so forming an oxide skeleton of the original knitted structure. This oxide skeleton is very delicate and easily damaged. When the pyrolysis is complete, the fuel gas is admitted to the burner and ignited, so rendering the mantle incandescent, this also consolidates the oxide skeleton and shapes it to fit the gas flame.

For use on the burners of other types of lights, the soft mantle described above is attached to a ceramic ring provided with internal lugs which engage with projections on the nozzle of the gaslight burner. The initial pyrolysis procedure is Performed on the gaslight exactly as described above for a gasoline lantern.

Another variation of inverted mantle manufacture is based on the soft mantle and ceramic ring assembly described above, but the pyrolysis is performed during manufacture. The resulting mantle, termed a hard or pre-formed mantle, is intended for use on fixed gaslights, but since the oxide skeleton is very fragile it is dipped in a collodion (nitro cellulose) solution and dried. The nitro-cellulose so deposited strengthens the oxide structure for transportation. The collodion deposit is burned off at the consumers lamp prior to ignition of the fuel gas. Knitted fabrics are particularly suitable for the fabrication of incandescent mantles since they can be produced directly in one-piece tubular form, and they possess elasticity in both the vertical and horizontal directions, which property aids the shrinking and forming process during pyrolysis, and which property is virtually absent from woven fabrics.

There are various forms of complex knit stitch used in mantle manufacture which are intended to enhance the strength of the oxide structure. Also, plain loop knit, also termed jersey knit, or stockinette knit, is used for some soft mantles. This form of knit uses interlinking loops, each loop is identical to every other loop both horizontally and vertically. However, the great friability of thorium oxide precludes substantial strength improvements based on structural modifications. "The Formation of Loops and Construction of Looped Fabrics" TECHNICS Volume 1, pg 499, George Newnes Ltd (London 1904) describes in some detail the structure and properties of plain knit textiles.

SUMMARY OF THE INVENTION

The present invention provides an improved incandescent mantle which is stronger than mantles produced in the past as well as free of radioactive materials The present invention provides a mantle comprised of zirconia, yttria and erbia which produces a resulting light output and color comparable for practical purposes to that of traditional thorium mantles. Although the present invention is particularly adapted to mantles of inverted form, it is also applicable to other forms.

DESCRIPTION OF THE DRAWING

The invention will be more fully described in the following detailed description, in conjunction with the drawing, the single figure of which is a graph indicating the preferred percent range of zirconium content and the preferred range of erbium to yttrium ratios before pyrolization of the mantle of the present invention.

DETAILED DESCRIPTION OF THE INVENTION

A fabric precursor mantle structure is prepared from rayon yarn. A preferred form is a tubular webbing comprised of knitted loops. Because considerable shrinkage occurs during subsequent processing, the webbing is fabricated so as to have approximately twice the diameter of the desired finished mantle after conversion to ceramic filament form. This shrinkage is desirable since it helps to compact and sinter the ceramic filaments during their formation. A precursor mantle is prepared from a section cut from the knitted tubing. Again because of shrinkage, the selected length of tubing is about twice the length of the desired finished mantle. This precursor tubing section may be tied or sewn if required so as to produce mantles of a form suitable for a particularly intended variety of lamp.

In preparation for the process of imbibition of the desired metal salts, the precursor mantle is soaked in plain distilled water. This has the effect of swelling or dilating the cellulosic fibers so as to promote the imbibition of the metal salts solution into the crystallite structure of the fibers.

The initial water soaking is extended over approximately 2 hours at room temperature, at the end of which the precursor mantle is removed from the water bath and the excess water removed by centrifugation, blotting, or other convenient means.

In the alternative, the precursor mantle may be initially placed in a bath of an aqueous solution of the desired metal salts without first presoaking the mantle as described above. The length of time of impregnation is approximately 10-15 minutes at a solution temperature of 120° F. A most preferred solution is comprised of zirconyl chloride, erbium chloride and yttrium chloride. The acceptable ranges of the percentages by weight before pyrolysis are shown in the drawing. Acceptable ranges of percentages of zirconyl chloride vary from about 60% to 66% zirconyl chloride with the remaining percentage to be made up of a combination of erbium chloride and yttrium chloride at a ratio which varies from about 2.20 to 1 to 2.40 to 1 erbium chloride to yttrium chloride. A most preferred range is comprised of about 62% to 64% zirconyl chloride with the remaining percentage to be made up of a combination of erbium chloride and yttrium chloride at a ratio of about 2.25 to 1 to 2.35 to 1 erbium chloride to yttrium chloride.

The presence of erbium in the product mantle is considered desirable since it is believed to act as a second stabilizing agent in the resulting yttrium toughened zirconium oxide ceramic filaments, and it is also believed to behave as an activating agent which enhances the light output beyond that obtained from a formulation of zirconia and yttria alone.

After removal of the precursor mantle from the impregnation bath, surplus solution is removed by a process such as centrifugation, and the structure is rapidly dried with warm air, or other convenient means.

The dried precursor mantle is then reacted with ammonia gas. The reaction converts the metal chlorides to their corresponding hyroxides, that is, to zirconium hydroxide, erbium hydroxide and yttrium hydroxide. This step serves several functions. First, it neutralizes the acidity of the various salts. Second, it preserves the integrity of the mantle fabric as the acidity of the metal salts may cause the mantle fabric to deteriorate. Thirdly, it may assist pyrolysis during the subsequent formation of oxide filaments. Finally, it appears to promote the spreading apart of individual filaments making up rayon yarn thereby increasing exposure to flame and enhancing light output.

At this point the precursor mantle is provided with a means of attachment to a burner nozzle, such as a length of heat resistant yarn stitched around the open end. Additional reinforcement of the mantle where it is attached to the burner nozzle of the lamp is usually required with a thorium mantle. However, the mantle of the present invention does not require added reinforcement except in special situations. This reinforcement may be achieved by impregnation of this zone of the mantle with a metal salt solution which will form additional oxide deposits. The reinforcing solution does not need to have the same illuminating properties as those used in the light emitting area of the mantle.

The precursor mantle is attached to a burner nozzle and converted to ceramic filament form by the ignition of a fuel/air mixture such as the one normally used to produce incandescence. This combustion pyrolyzes the rayon fabric to form carbon, which is then consumed and dissipated as carbon dioxide, while the metallic salts are converted into oxide ceramic filaments to form a skeletal replica of the original cellulosic precursor, but approximately half its size.

Alloying between the various component oxides occurs during this process, so imparting the desired properties by the formation of yttrium/erbium stabilized zirconia.

EXAMPLE

An inverted precursor mantle, measuring about 2 ½ inches long and 2 inches in diameter, was prepared in accordance with this invention, using webbing knitted in plain loop stitches from 600 denier rayon yarn. The precursor mantle was then impregnated for 15 minutes at 120° F. with an aqueous solution composed of zirconyl chloride in the range of about 62%-64% with the remaining percentage of the solution composed of an erbium/yttrium chloride ratio of about 2.25-2.35 to 1. Excess fluid was removed by centrifugation and the sample was dried with warm air.

A length of heat resistant yarn was threaded through the fabric forming the open end of the mantle and the mant.. was then tied to the burner nozzle of a Coleman propane lantern type 5107C. After propane fuel gas was ignited, the mantle carbonized, turning black. It then became red hot, and converted to a white ceramic filament form. The mantle became incandescent, emitting a light very similar to the pale yellow/white color of a commercial thorium mantle.

Shrinkage during this operation reduced the mantle to about 52% of its former size.

The light output when the lantern was burning was comparable for practical purposes to that of a thorium mantle. The mantle of this invention was removed from the lantern and sample strips of the ceramic filament fabric were prepared for tensile tests by cementing small sections of thin card as supports at the ends of the strip. The fabric folded flat upon itself on the horizontal axis easily and without breakage, and the rows of knitted filament loops moved vertically over each other without breakage.

Vibration tests on the pyrolized mantle showed the mantle of the present invention to be about 5 times stronger than that of a thorium mantle.

It will be recognized that, although the present disclosure represents the preferred embodiment of the invention with a certain degree of particularity, changes in the composition and structure can be resorted to without departing from the spirit and scope of the invention hereinafter claimed.

What is claimed is:

1. A precursor mantle for incandescent gas lamps comprising:
   a substrate impregnated with a solution of salts of zirconium, yttrium and erbium which when pyrolized, form corresponding oxides.

2. The precursor mantle of claim 1 wherein the percentage of zirconium salt in said solution ranges from 60% to 66%.

3. The precursor mantle of claim 2 wherein the ratio of erbium to yttrium salts in said solution ranges from 2.20-2.40 to 1.

4. The precursor mantle of claim 1 wherein the percentage of zirconium salt in said solution ranges from 62% to 64%.

5. The precursor mantle of claim 4 wherein the ratio of erbium to yttrium salts in said solution ranges from 2.25-2.35 to 1.

6. The precursor mantle of claim 1 wherein said substrate is a cellulosic fabric substrate.

7. The precursor mantle of claim 6 wherein said cellulosic fabric substrate is rayon.

8. The precursor mantle of claim 1 wherein said substrate is a fabric having tubular webbing comprised of knitted loops.

9. A precursor mantle for incandescent gas lamps comprising:
   a substrate containing salts of zirconium, yttrium and erbium which when pyrolized, form corresponding oxides.

10. A mantle for incandescent lamps comprised of zirconium oxide, erbium oxide, and yttrium oxide, wherein said oxides are in proportions resulting from a salt of zirconium in a range from 60-66%, and from salts of erbium and yttrium in an erbium/yttrium ratio of 2.20 2.40 to 1.

11. The mantle of claim 10 wherein said oxides are in proportions resulting from a salt of zirconium in a range from about 62% to 64%, and from salts of erbium and yttrium in an erbium/yttrium ratio of 2.25-2.35 to 1.

12. A mantle for incandescent gas lamps prepared by a process comprising the steps of:
   impregnating a combustible substrate with a solution of salts of zirconium, erbium, and yttrium;
   withdrawing said combustible substrate from said solution; and
   drying said combustible substrate.

13. The mantle for incandescent gas lamps of claim 12 wherein said solution is comprised of a zirconium salt in a percentage which ranges from about 60% to 66% and the remaining precentage of said solution is comprised of a ratio of erbium/yttrium salts of about 2.20-2.40 to 1.

14. The mantle for incandescent gas lamps of claim 12 wherein said solution is comprised of a zirconium salt in a percentage which ranges from about 62% to 64% and the remaining percentage of said solution is comprised of a ratio of erbium/yttrium salts of about 2.25-2.35 to 1.

15. The mantle of claim 12 prepared by the process further comprising the step of:
   pyrolizing said combustible substrate impregnated with said solution.

* * * * *

UNITED STATES PATENT AND TRADEMARK OFFICE
CERTIFICATE OF CORRECTION

PATENT NO. : 5,071,799
DATED : December 10, 1991
INVENTOR(S) : John P. Edgar

It is certified that error appears in the above-identified patent and that said Letters Patent is hereby corrected as shown below:

Column 8, line 20-21, "ratio of 2.20 2.40 to 1" should read --ratio of 2.20-2.40 to 1--.

Column 8, line 36, "precentage" should read --percentage--.

Signed and Sealed this

Third Day of August, 1993

Attest:

MICHAEL K. KIRK

*Attesting Officer*    Acting Commissioner of Patents and Trademarks